United States Patent
Evans et al.

(10) Patent No.: US 10,304,577 B2
(45) Date of Patent: May 28, 2019

(54) METHOD FOR MEASURING BOW/TWIST OF A FUEL ASSEMBLY

(71) Applicant: Westinghouse Electric Company LLC, Cranberry Township, PA (US)

(72) Inventors: Paul M. Evans, Chapin, SC (US); Benjamin T. Burnette, Columbia, SC (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 710 days.

(21) Appl. No.: 14/824,256

(22) Filed: Aug. 12, 2015

(65) Prior Publication Data

US 2017/0047131 A1 Feb. 16, 2017

(51) Int. Cl.
*G21C 21/02* (2006.01)
*G21C 17/06* (2006.01)
*G01B 11/16* (2006.01)

(52) U.S. Cl.
CPC .............. *G21C 21/02* (2013.01); *G21C 17/06* (2013.01); *G01B 11/18* (2013.01)

(58) Field of Classification Search
CPC .......... G21C 17/10; G01L 1/242; G01B 11/18
See application file for complete search history.

(56) References Cited

U.S. PATENT DOCUMENTS

| | | | | |
|---|---|---|---|---|
| 3,940,996 A | * | 3/1976 | Lauhoff | G01F 1/582 374/E7.039 |
| 5,852,642 A | * | 12/1998 | Descot | G01B 7/345 33/502 |
| 7,154,081 B1 | * | 12/2006 | Friedersdorf | G01B 11/18 250/227.14 |
| 2009/0257546 A1 | | 10/2009 | Lu et al. | |
| 2012/0222489 A1 | * | 9/2012 | Hummel | G01B 5/25 73/779 |
| 2014/0362966 A1 | * | 12/2014 | Fushimi | G01T 3/006 376/254 |

OTHER PUBLICATIONS

Luna. Fiber Optic Shape Sensing, current state of technology. Jun. 21, 2013. Luna Innovations Incorporated. 6 pages. available online <http://lunainc.com/wp-content/uploads/2012/08/SS-00021-D-TS_FiberOptic-Shape-Sensing-Snapshot+TechBackground_Rev003.pdf>.*
Luna. Fiber Optic Shape Sensing, current state of technology. Jun. 21, 2013. Luna Innovations Incorporated. 6 pages. (Year: 2013).*

* cited by examiner

*Primary Examiner* — Lily C Garner
(74) *Attorney, Agent, or Firm* — Joseph C. Spadacene; Westinghouse Electric Company LLC

(57) ABSTRACT

A method of determining the bow and twist of a nuclear fuel assembly that utilizes fiber optic shape sensing technology enclosed within a flexible sheath that transmits strain on the interior walls of a control rod guide thimble within the fuel assembly to a fiber cable of the shape sensing technology enclosed within the sheath. The sheath conforms to the interior dimensions of the interior walls of the guide thimble.

8 Claims, 5 Drawing Sheets

METHOD FOR MEASURING BOW/TWIST OF A FUEL ASSEMBLY

BACKGROUND

1. Field

This invention pertains generally to a nuclear reactor fuel assembly and more particularly to a method of determining whether a nuclear fuel assembly has deviated from at least some of its specifications.

2. Related Art

The primary side of nuclear reactor power generating systems which are cooled with water under pressure comprises a closed circuit which is isolated and in heat exchange relationship with a secondary side for the production of useful energy. The primary side comprises the reactor vessel enclosing a core internal structure that supports a plurality of fuel assemblies containing fissile material, the primary circuit within heat exchange steam generators, the inner volume of a pressurizer, pumps and pipes for circulating pressurized water; the pipes connecting each of the steam generators and pumps to the reactor vessel independently. Each of the parts of the primary side comprising a steam generator, a pump and a system of pipes which are connected to the vessel form a loop of the primary side.

For the purpose of illustration, FIG. 1 shows a simplified nuclear reactor primary system, including a generally cylindrical reactor pressure vessel 10 having a closure head 12 enclosing a nuclear core 14. A liquid reactor coolant, such as water is pumped into the vessel 10 by pump 16 through the core 14 where heat energy is absorbed and is discharged to a heat exchanger 18, typically referred to as a steam generator, in which heat is transferred to a utilization circuit (not shown), such as a steam driven turbine generator. The reactor coolant is then returned to the pump 16, completing the primary loop. Typically, a plurality of the above described loops are connected to a single reactor vessel 10 by reactor coolant piping 20.

An exemplary reactor design is shown in more detail in FIG. 2. In addition to the core 14 comprised of a plurality of parallel, vertical, co-extending fuel assemblies 22, for purposes of this description, the other vessel internal structures can be divided into the lower internals 24 and the upper internals 26. In conventional designs, the lower internals function is to support, align and guide core components and instrumentation as well as direct flow within the vessel. The upper internals restrain or provide a secondary restraint for the fuel assemblies 22 (only two of which are shown for simplicity in this figure), and support and guide instrumentation and components, such as control rods 28. In the exemplary reactor shown in FIG. 2, coolant enters the reactor vessel 10 through one or more inlet nozzles 30, flows down through an annulus between the vessel and the core barrel 32, is turned 180° in a lower plenum 34, passes upwardly through a lower support plate 37 and a lower core plate 36 upon which the fuel assemblies 22 are seated and through and about the assemblies. In some designs, the lower support plate 37 and the lower core plate 36 are replaced by a single structure, the lower core support plate, at the same elevation as 37. The coolant flow through the core and surrounding area 38 is typically large on the order of 400,000 gallons per minute at a velocity of approximately 20 feet per second. The resulting pressure drop and frictional forces tend to cause the fuel assemblies to rise, which movement is restrained by the upper internals, including a circular upper core plate 40. Coolant exiting the core 14 flows along the underside of the upper core plate 40 and upwardly through a plurality of perforations 42. The coolant then flows upwardly and radially to one or more outlet nozzles 44.

The upper internals 26 can be supported from the vessel or the vessel head and include an upper support assembly 46. Loads are transmitted between the upper support assembly 46 and the upper core plate 40, primarily by a plurality of support columns 48. A support column is aligned above a selected fuel assembly 22 and perforations 42 in the upper core plate 40.

The rectilinearly moveable control rods 28 typically include a drive shaft 50 and a spider assembly 52 of neutron poison rods that are guided through the upper internals 26 and into aligned fuel assemblies 22 by control rod guide tubes 54. The guide tubes are fixedly joined to the upper support assembly 46 and connected by a split pin 56 force fit into the top of the upper core plate 40. The pin configuration provides for ease of guide tube assembly and replacement if ever necessary and assures that the core loads, particularly under seismic or other high loading accident conditions are taken primarily by the support columns 48 and not the guide tubes 54. This support column arrangement assists in retarding guide tube deformation under accident conditions which could detrimentally affect control rod insertion capability.

FIG. 3 is an elevational view, represented in vertically shortened form, of a fuel assembly being generally designated by reference character 22. The fuel assembly 22 is the type used in a pressurized water reactor and has a structural skeleton which, at its lower end includes a bottom nozzle 58. The bottom nozzle 58 supports the fuel assembly 22 on a lower core support plate 36 in the core region of the nuclear reactor. In addition to the bottom nozzle 58, the structural skeleton of the fuel assembly 22 also includes a top nozzle 62 at its upper end and a number of guide tubes or thimbles 54, which extend longitudinally between the bottom and top nozzles 58 and 62 and at opposite ends are rigidly attached thereto.

The fuel assembly 22 further includes a plurality of transverse grids 64 axially spaced along and mounted to the guide thimbles 54 (also referred to as guide tubes) and an organized array of elongated fuel rods 66 transversely spaced and supported by the grids 64. Although it cannot be seen in FIG. 3 the grids 64 are conventionally formed from orthogonal straps that are interleafed in an egg crate pattern with the adjacent interface of four straps defining approximately square support cells through which the fuel rods 66 are supported in transversely spaced relationship with each other. In many conventional designs springs and dimples are stamped into the opposing walls of the straps that form the support cells. The springs and dimples extend radially into the support cells and capture the fuel rods therebetween; exerting pressure on the fuel rod cladding to hold the rods in position. Also, the assembly 22 has an instrumentation tube 68 located in the center thereof that extends between and is mounted to the bottom and top nozzles 58 and 62. With such an arrangement of parts, fuel assembly 22 forms an integral unit capable of being conveniently handled without damaging the assembly of parts.

As mentioned above, the fuel rods 66 in the array thereof in the assembly 22 are held in spaced relationship with one another by the grids 64 spaced along the fuel assembly length. Each fuel rod 66 includes a plurality of nuclear fuel pellets 70 and is closed at its opposite ends by upper and lower end plugs 72 and 74. The pellets 70 are maintained in a stack by a plenum spring 76 disposed between the upper end plug 72 and the top of the pellet stack. The fuel pellets 70, composed of fissile material, are responsible for creating the reactive power of the reactor. The cladding which surrounds the pellets functions as a barrier to prevent the fission by-products from entering the coolant and further contaminating the reactor system.

To control the fission process, a number of control rods 28 are reciprocally moveable in the guide thimbles 54 located at predetermined positions in the fuel assembly 22. Specifically, a rod cluster control mechanism 80 positioned above the top nozzle 62 supports the control rods 28. The control mechanism has an internally threaded cylindrical hub member 82 with a plurality of radially extending flukes or arms 52. Each arm 52 is interconnected to the control rods 28 such that the control rod mechanism 80 is operable to move the control rods vertically in the guide thimbles 54 to thereby control the fission process in the fuel assembly 22, under the motive power of control rod drive shafts 50 which are coupled to the control rod hubs 82, all in a well-known manner.

As previously mentioned, the fuel assemblies are subject to hydraulic forces that exceed the weight of the fuel rods and thereby exert significant forces on the fuel rods and the fuel assemblies. In addition, there is significant turbulence in the coolant in the core caused by mixing vanes on the upper surfaces of the straps of many grids, which promote the transfer of heat from the fuel rod cladding to the coolant. The substantial flow forces and turbulence can result in severe fretting of the fuel rod cladding if motion of the fuel rods is not restrained. Fretting of the fuel rod cladding can lead to a breach and expose the coolant to the radioactive byproducts within the fuel rods. These same forces can cause vibrations of the fuel assemblies which are restrained by their close proximity to the adjacent assemblies or peripheral core internal hardware. These close tolerances require that the fuel assemblies be manufactured to exacting standards, avoiding any bow or twist which might arise from, for example the welding of the guide thimbles to the grid straps. Any bow or twist may inhibit the insertion or withdrawal of the fuel assemblies from the core.

Accordingly, a new method is desired that will confirm that these close tolerances are satisfied.

Furthermore, Such a method is desired that can be carried out expeditiously as not to impede the fuel assembly manufacturing process.

Further such a method is desired that can also be carried out on spent nuclear fuel assemblies.

In addition, such a method is desired that can accommodate thimble tubes having varying diameters or thimble tubes of different diameters.

SUMMARY

In accordance with this invention these and other objects are satisfied by a method of determining any distortion along an elongated, axial length of a nuclear fuel assembly having a top nozzle and a bottom nozzle axially spaced from the top nozzle and a thimble tube axially extending between the top nozzle and the bottom nozzle. The method comprises the step of positioning a plurality of strain gauges along a centerline of the thimble tube extending substantially from the top nozzle to the bottom nozzle. Each of the strain gauges is maintained in physical contact with an inside wall of the thimble tube around an inside circumference of the thimble tube at an axial location of the corresponding strain gauge. The output of each of the strain gauges is then transmitted to a remote location.

Preferably, the strain gauges are fiber optic strain gauges and in one embodiment the strain gauges are enclosed within an outer sheath that extends substantially the axial length of the thimble tube extending substantially between the top nozzle and the bottom nozzle. Desirably, the sheath substantially occupies an entire space between the inside wall of the thimble tube around the entire circumference of the inside wall and the strain gauges at the axial locations of the corresponding strain gauges. In one preferred embodiment the outer sheath is configured to be removable from the strain gauges and replaced with an outer sheath having a different outside diameter to accommodate different thimble tubes having different inside diameters. In one such embodiment the outer sheath has an outside diameter that varies along an axial length of the outer sheath to mate with the inside diameter of the thimble. Preferably, the sheath is flexible.

In still another embodiment the strain gauges are spaced along the centerline of the thimble tube. In all such embodiments the strain gauges are configured to determine the twist and bow of the nuclear fuel assembly and the strain gauges provide a substantially continuous measurement along the axial length of the thimble tube.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

The current method to measure a fuel assembly bow and twist during production and after irradiation is derived from grid envelope measurements. A more direct method of measuring fuel assembly strain induced deformation during manufacture would likely yield a better understanding of the causes and engineering solutions which could avoid such occurrences and/or provide for a cost effective, acceptable fix. Furthermore, such a method that could efficiently be applied to irradiated fuel assemblies could provide information on the acceptability of reinsertion of a fuel assembly into a different core location during refueling or whether special accommodation needs to be made for a spent fuel assembly for storage. Such a method could also advance the state of the art in measuring assembly strain and deflection in a development laboratory.

Another method to measure fuel assembly distortion is to visually compare a string that is stretched along the length of the assembly to determine the profile of the assembly. This method does not provide accurate information during manufacture and does not readily identify both twist and assembly bow, and is not practical to apply in an irradiated environment. This invention overcomes those limitations.

A new three-dimensional shape sensing technology has been developed by NASA. This new technology is commonly referred to as fiber optic shape sensing. This technology involves mounting many fiber optic strain gauges along the length of a fiber optic cable and using the strain measurements to calculate X-Y-Z coordinates along every point of the fiber optic cable. These products are commercially available from companies like LUNA, Roanoke, Va. and 4DSP, Austin, Tex.

Figure 1:
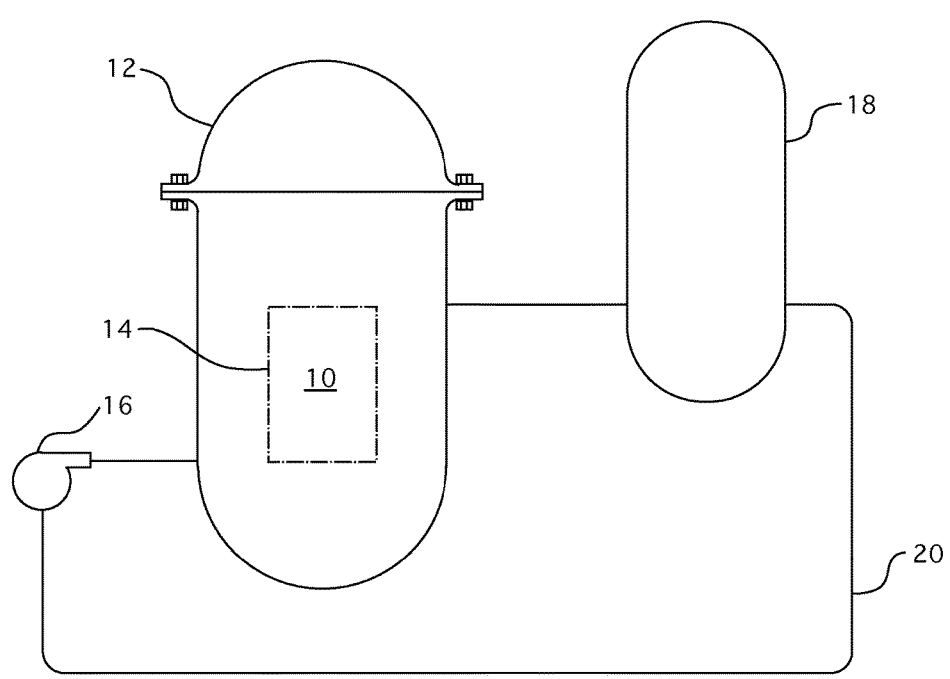
FIG. 1 is a simplified schematic of a nuclear reactor system to which this invention can be applied.
Figure 2:
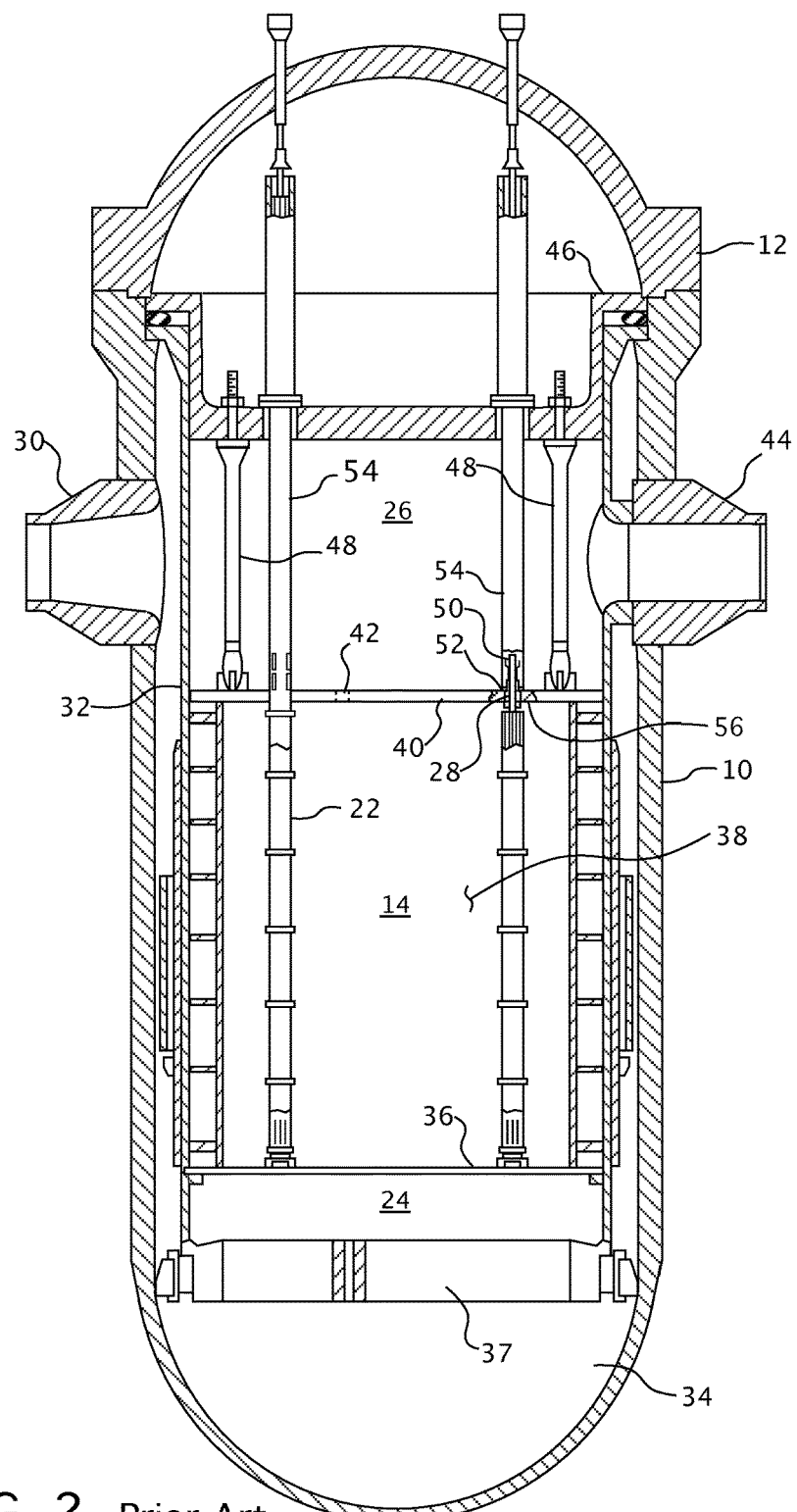
FIG. 2 is an elevational view, partially in section, of a nuclear reactor vessel and internal components to which this invention can be applied.
Figure 3:
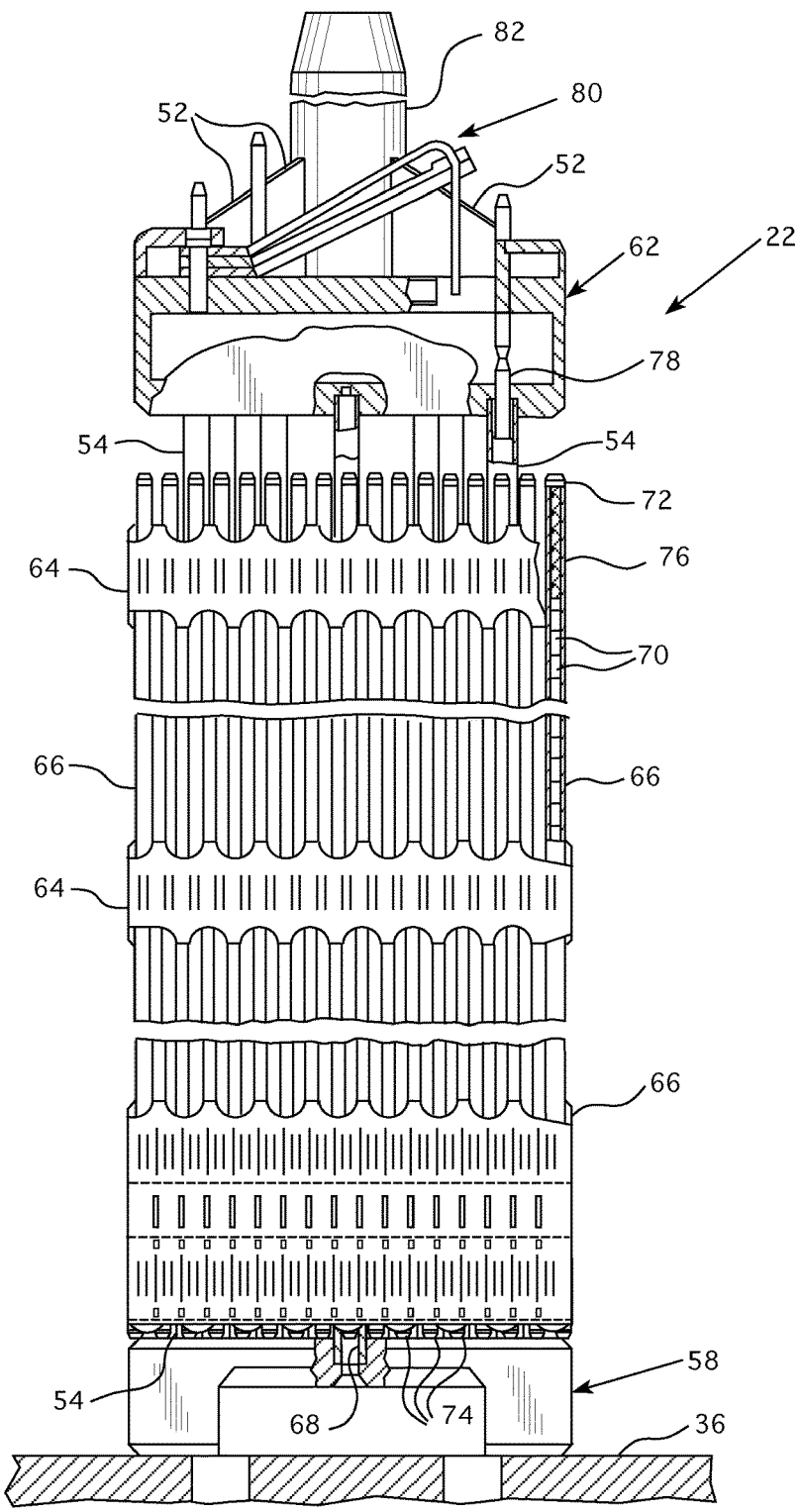
FIG. 3 is an elevational view, partially in section, of a fuel assembly illustrated in vertically shortened form, with parts broken away for clarity.
Figure 4:
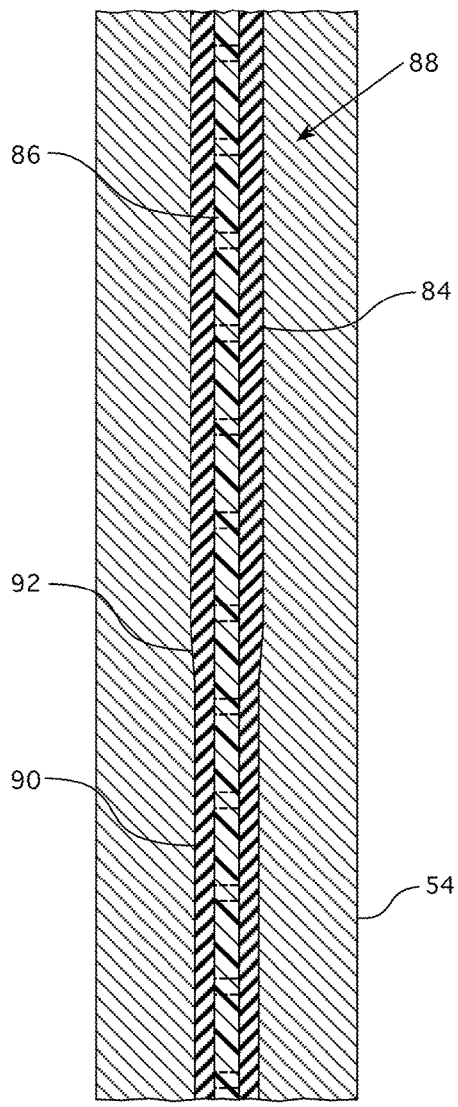
FIG. 4 is a schematic cross sectional view of a fiber optic sensing cable and sheath in accordance with one embodiment of this invention.
Figure 5:
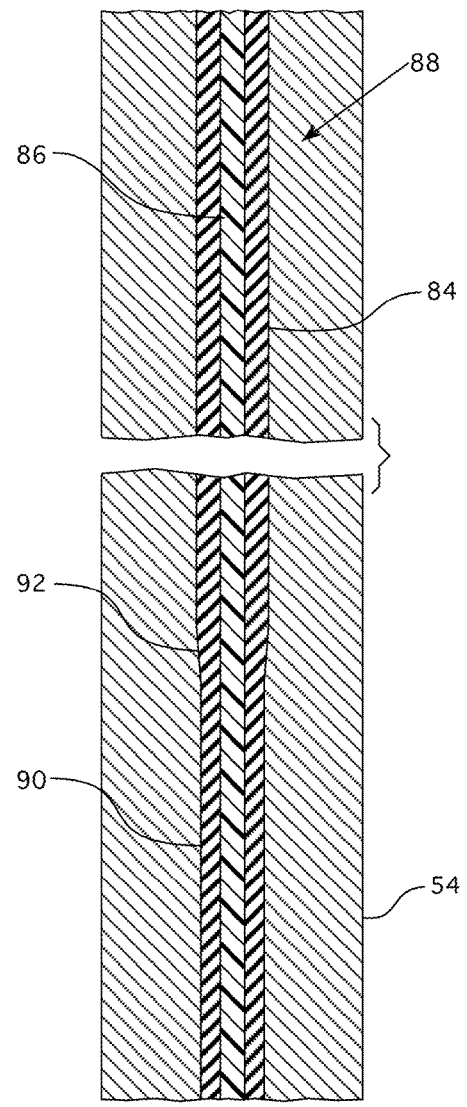
FIG. 5 is a schematic cross sectional view of the fiber optic sensing cable and sheath shown in Figure adapted for a different sized thimble tube.
Figure 6:
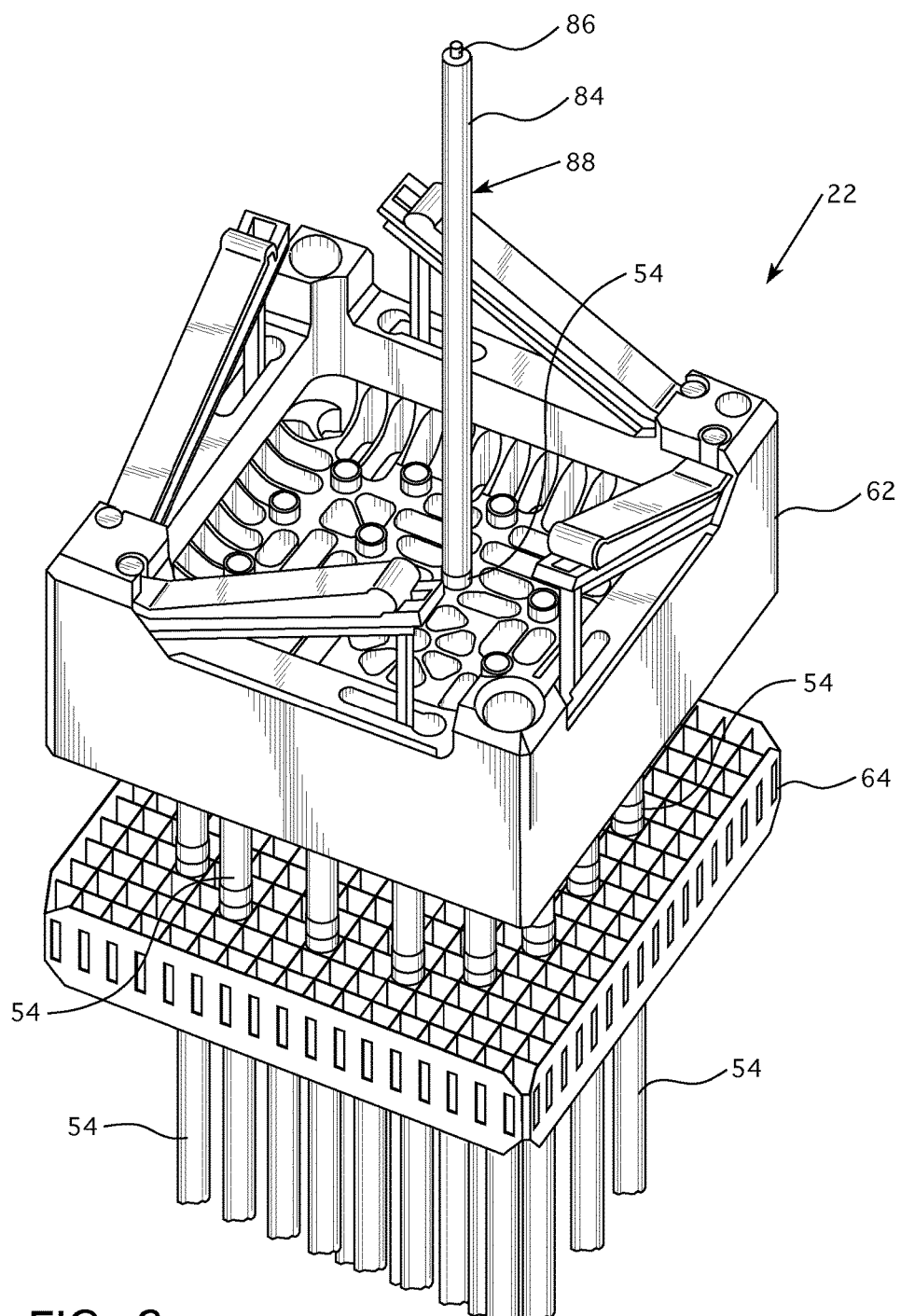
FIG. 6 is a perspective view of a top of a fuel assembly skeleton showing a fiber optic sensing cable and sheath being inserted into a thimble tube.

This invention uses this technology in order to accurately measure the profile of a fuel assembly thimble tube. The fiber optic cable would be inserted into a specially designed flexible sheath 84, one embodiment of which is shown in schematic cross-section in FIG. 4, the combined sheath 84 and fiber optic cable being referred to as the strain measurement assembly 88. The sheath 84 is used to both protect the fiber optic cable 86, as well as to position the cable in the center of the thimble guide tube 54. The outer dimensions of the sheath 84 has the same dimensions as the ID of a thimble tube 54, including the dashpot region in which the inside diameter of the thimble tube 54 narrows. The sheath has to have a sufficient density to transfer the strain on the thimble tube to the fiber optic cable 86. The sheath 84 may be constructed out of a polyethylene based shielding material or other materials having similar characteristics or other materials having similar characteristics. These materials are commercially available from Shieldwerx in Rio Rancho, N. Mex. The larger diameter of the sheath 84 is shown by reference character 92 and the smaller diameter by reference character 90. Note that the dimensions are not drawn to scale and the thickness of the guide thimble walls is exaggerated to highlight the close contact of the sheath 84 with the inner walls of the thimble tube 54. Multiple interchangeable sheaths are available to accommodate each type of thimble tube, as the inner profile for a 14×14 fuel assembly thimble tube is different than that of a 17×17 fuel assembly thimble tube. FIG. 5 is a variation of the embodiment shown in FIG. 4 to illustrate a different sized sheath to accommodate a different sized thimble tube. Like reference characters are used among the several figures to identify corresponding components. The sheath and fiber optic sensor would be inserted through the top of the assembly 22 into an individual thimble tube 54 as shown in FIG. 6 and would be inserted all the way into the dashpot portion of the thimble tube. A remote data acquisition system would be used to gather the data for future analysis. Potential practical applications of this technology are:

1. Measuring assembly bow and twist in irradiated fuel assemblies;
2. Fuel assembly bow and twist inspection for product release instead of the current practice of measuring discreet points on the grid envelope;
3. Measuring deflection and strain of fuel assemblies in tests performed in a development lab (for instance: the fuel assembly mechanical test, flowing water damping test, etc.). This would potentially replace LVDTs to measure deflection and the welded-on strain gages used to measure strain; and
4. Measurement of guide tube distortion—the guide tube is the apparatus above the reactor core that houses the core components; this structure is known to distort during manufacturing (after welding) and the fiber optic shape sensing technology may provide a means to measure this distortion.

The foregoing uses are just examples of the benefits of this invention and other uses may become apparent upon its implementation.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A method of determining a distortion along an elongated, axial length of a nuclear fuel assembly having a top nozzle and a bottom nozzle axially spaced from the top nozzle and a thimble tube axially extending between the top nozzle and the bottom nozzle, the method comprising the steps of:

positioning a plurality of strain gauges supported along a length of a fiber optic cable, enclosed within a closely fitting flexible outer sheath, along a centerline of the thimble tube extending substantially from the top nozzle to the bottom nozzle, the sheath having a sufficient density and contact with each of the fiber optic cable and an inside wall of the thimble tube to transfer a strain on the thimble tube to the fiber optic cable, the outer sheath having a length corresponding to and extending along the length of the fiber optic cable;

maintaining the outer sheath in physical contact with an inside wall of the thimble tube around the inside circumference of the thimble tube at an axial location of the corresponding strain gauge; and transmitting an output of each of the strain gauges to a remote location.

2. The method of claim 1 wherein the strain gauges are fiber optic strain gauges.

3. The method of claim 1 wherein the outer sheath substantially occupies an entire space between the inside wall of the thimble tube around the entire circumference of the inside wall and the strain gauges at the axial locations of the corresponding strain gauges.

4. The method of claim 3 wherein the outer sheath is configured to be removable from the strain gauges and replaced with an outer sheath having a different outside diameter to accommodate different thimble tubes having different inside diameters.

5. The method of claim 3 wherein the outer sheath has an outside diameter that varies along an axial length of the outer sheath to mate with the inside wall of the thimble tube.

6. The method of claim 1 wherein the strain gauges are spaced from one another, along the centerline of the thimble tube.

7. The method of claim 1 configured to determine the twist and bow of the nuclear fuel assembly.

8. The method of claim 1 wherein the strain gauges provide a substantially continuous measurement along an axial length of the thimble tube.

* * * * *